Figure 1:
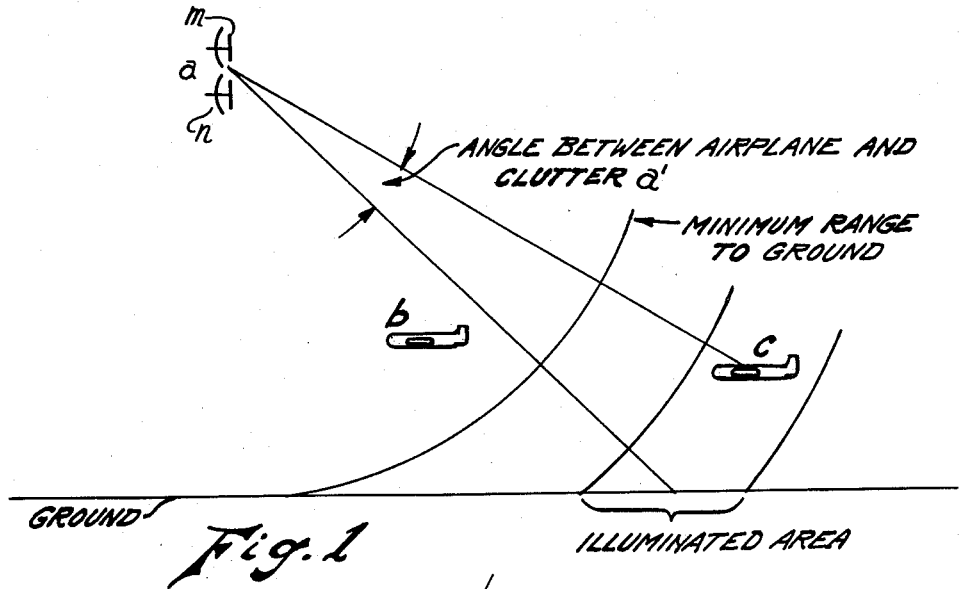

Dec. 15, 1964 L. M. HOLLINGSWORTH 3,161,873
MOVING TARGET INDICATION METHOD AND SYSTEM
Filed Nov. 3, 1961 2 Sheets-Sheet 1

INVENTOR.
LOWELL M. HOLLINGSWORTH
BY
ATTORNEYS

United States Patent Office 3,161,873
Patented Dec. 15, 1964

3,161,873
MOVING TARGET INDICATION METHOD AND SYSTEM
Lowell M. Hollingsworth, Lincoln, Mass., assignor to the United States of America as represented by the Secretary of the Air Force
Filed Nov. 3, 1961, Ser. No. 150,103
3 Claims. (Cl. 343—7.7)
(Granted under Title 35, U.S. Code (1952), sec. 266)

The invention described herein may be manufactured and used by or for the United States Government for governmental purposes without payment to me of any royalty thereon.

This invention relates to a method and system for distinguishing between stationary and moving targets in radar systems.

In observing any area, it is always the moving objects which are of the greatest interest. Thus, in radar work we have MTI; an abbreviation for moving target indication. The apparatus to accomplish MTI commonly, depends on distinguishing in some manner the doppler frequency created by the moving target. The problem is, of course, to pick out the desired small doppler signal from the large clutter signal caused by reflections from the ground, etc.

In accordance with the present invention moving target discrimination does not depend on the aforementioned doppler frequencies. Target and clutter viewed from a radar are both illuminated within the same pulse length and where the lines of sight to them form at least a small angle, then the field pattern at the radar resulting from the signal returns contain variations in phase and amplitude. These variations are sensed by utilizing two receiving antennas displaced from each other but positioned so that their fields of view are the same. With the receiving antennas displaced vertically, this gives a response dependent on elevation angle, hence there is provided an application to elevated target identification. By adding pulse-to-pulse comparison, moving target indication is also provided as long as some clutter and clutter containing the target are viewed simultaneously and at least a small viewing angle is formed at the radar.

One advantage over the prior art resides in an AMTI (airborne moving target indication) system which incorporates the method and system of the present invention in that moving targets are indicated equally well in all directions. The aforesaid ability of the system of the present invention to see or indicate in all directions is achieved as follows: The variations in the field near the radar exist because of the interference between the returns from the target and other clutter. Changes in the field pattern take place rapidly because of small changes in position of the target which can be sensed at the airplane carrying the radar. Changes in position of the airplane cause only very small changes in the field pattern. Therefore, for AMTI purposes, moving targets are distinguished equally well in all directions from the airplane.

An object of the present invention is to provide a method of radar moving target indication wherein the moving target and stationary target viewed from a radar is illuminated within the same radar pulse length and the lines of sight to them form at least a small angle.

Another object of the present invention is to provide a radar moving target indication method wherein the interference between the returns from a moving target in clutter and other clutter results in variations in the field near the radar.

Still another object of the present invention is to provide a radar moving target indication system wherein a radar illuminates a moving target and stationary target within the same radar pulse length, and the lines of sight to them form at least a small angle and two radar receiving antennas provided for aforesaid target and clutter are displaced from each but positioned so that their fields of view are the same.

Yet another object of the present invention is to provide a radar moving target indication system wherein two radar receiving antennas are vertically displaced from each other but positioned so that their fields of view are the same in order to sense the variations in field pattern at the radar resulting from interference between a moving target and a stationary target.

A further object of the present inveniton is to provide a radar moving target indication system wherein two radar receiving antennas associated with aforesaid radar are vertically displaced from each other but positioned so that their fields of view are the same for reception of return signals from a moving target and a stationary target which are both illuminated within the same radar pulse length and the lines of sight to them form at least a small angle.

The various features of novelty which characterize this invention are pointed out with particularity in the claims annexed to and forming part of this specification. For a better understanding of the invention, however, its advantages and specific objects obtained with its use, reference should be had to the accompanying drawings and descriptive matter in which is illustrated and described a preferred embodiment of the invention.

Figure 2:
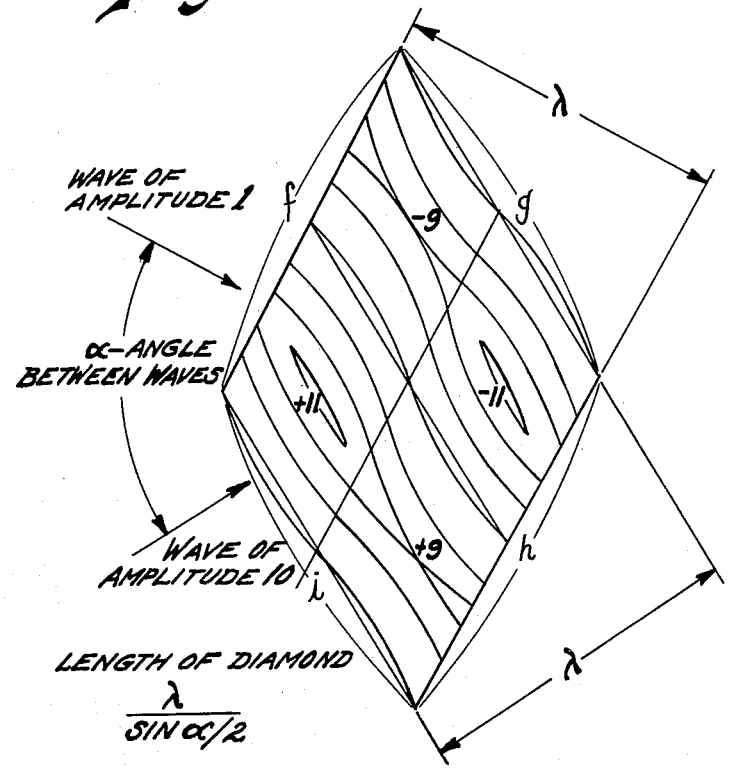
Figure 3:
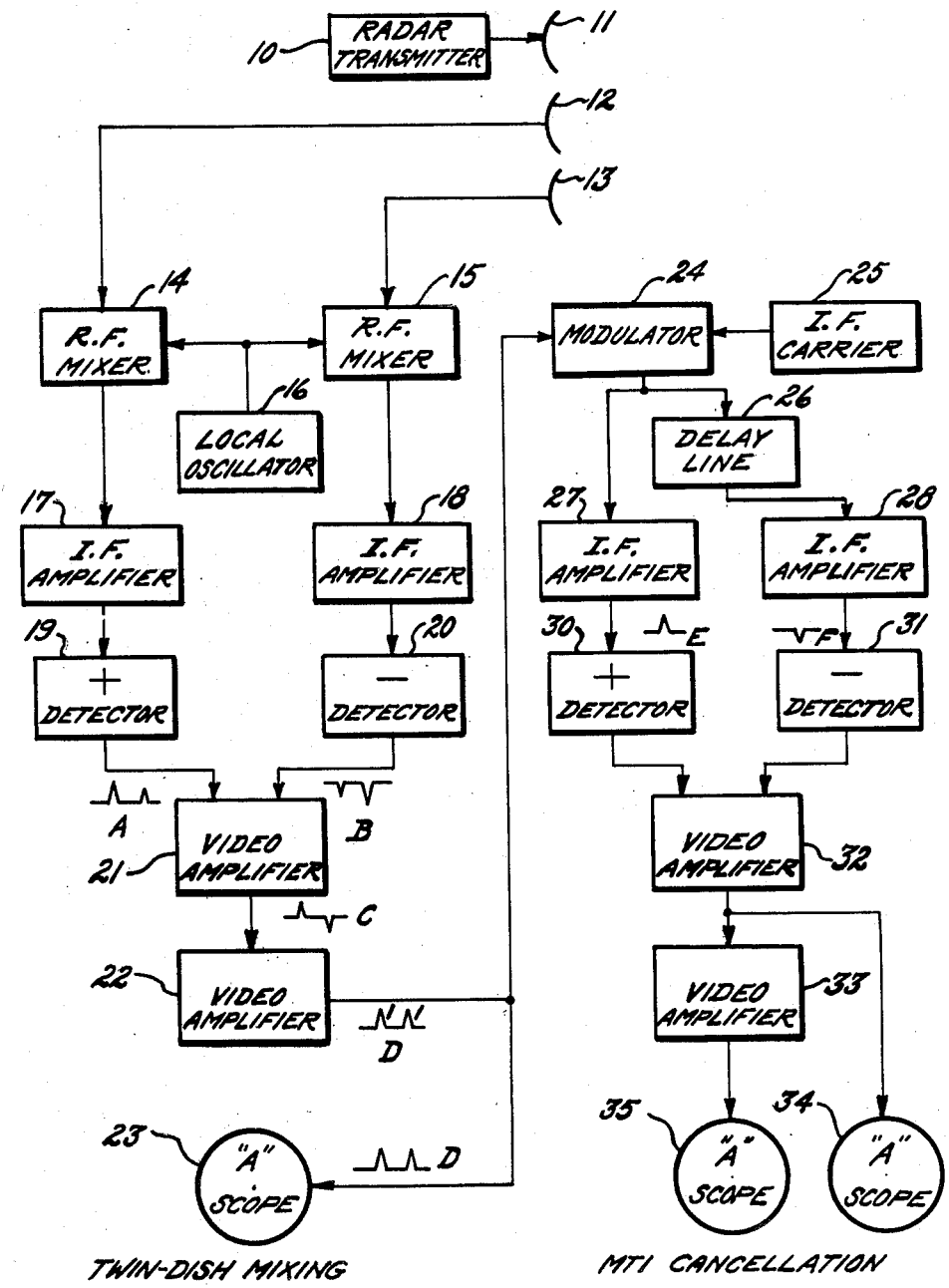

Of the drawings:
FIGURE 1 is a diagram illustrating the plane-to-plane radar problem;
FIGURE 2 shows the field configuration for two intersecting waves wherein there is an amplitude ratio of 10 to 1; and
FIGURE 3 is a block diagram of the preferred embodiment of the present invention.

Now referring in detail to FIGURE 1, a radar located at "$a$" illuminates moving targets at "$b$" and "$c$" and the ground. Adjacent to radar position "$a$" there is also located two of its associated receiving antennas "$m$" and "$n$" respectively, which are displaced vertically from each other. Target "$b$" is closer to the radar than is the ground and will be immediately discernible as a discrete target. However, the return from target "$c$," which is at a range greater than the range to ground, will be received together with a large return from the ground—that is—a clutter return.

The signals from "$c$" and from the ground are returned toward "$a$" but at different angles. These returned signals are caused by the same incident wave so in a way they may be considered as coming from two elements of an antenna. The two elements are located many wavelengths apart. As a result the pattern will contain many maximum and minimum values. (Maximum and minimum rather than maximum and zero because the strength of returns from target and from ground is not equal.)

The field pattern of returns at "$a$" could be arrived at by this antenna concept. However, a preferable method is to express the pattern in terms of the angle between the sources given as "$a'$" in FIGURE 1.

In FIGURE 2, the field pattern is shown computed on this basis for waves having amplitude of ten to one. These values were chosen as being somewhat representative of the amplitudes encountered in practice. The incident fields add to give maximum points of plus and minus eleven, and to give minimum values of plus and minus nine. Zero values also are obtained between plus and minus values. FIGURE 2 shows that the recurrent unit of the field pattern assumes a diamond shape by repetitions of which the complete pattern may be built up. The aforesaid diamond shape is in reality an approximation of the outer perimeter of the field patterns as indicated by lines $f$, $g$, $h$, and $i$, respectively. FIGURE 2 has been drawn for a convenient angle and this pattern holds for all angles, since the length and breadth of the diamond are sine and cosine functions of the angle between incident waves.

For a 10 cm. wavelength, the distance between the maximum and minimum values for an angle of 1° will be 18.9 ft. and at 3 cm. 6.7 ft. These values are proportionately less for larger angles.

These distances are the minimum spacing between two antennas for which maximum sensitivity is obtained. It does not mean that no variation will be obtained for lesser distances, nor does it mean that performance will be deteriorated by the presence of many maximum and minimum values.

From FIGURE 2, it may be judged how the pattern will change as the ratio of amplitudes change. The maximum and minimum values will always be obtained at the same points and the larger the ratio, the straighter the field lines become. This says that as the disturbing waves disappear, the resulting field becomes less and less different from the simple plane wave field pattern.

However, when there is some ratio between the fields, such as in FIGURE 2, it is seen that there is both a phase shift and an amplitude variation with height which may be utilized to disclose the presence of a target. However, it will be noted that the phase shift takes place at points different from the points where an amplitude change has occurred. This means that, in most cases, a phase and amplitude change will be obtained, although when a maximum amplitude change is obtained, no phase change will be obtained, and vice versa.

Now referring in detail to FIGURE 3, there is shown in the embodiment ground-based conventional radar transmitter 10 which radiates by way of parabolic antenna 11 pulses of radio frequency energy which are then reflected from stationary and moving targets. The stationary targets are in most instances the ground or ocean area. The reflected energy is received by parabolic antennas 12 and 13. Parabolic antennas 12 and 13 are vertically displaced from each other and so positioned as to have the same field of view. When the moving target and ground are viewed from transmitting antenna 11 so that both are illuminated within the same pulse length and the lines of sight to them form at least a small angle, then the field pattern at the vertically displaced receiving antennas contain variations in phase and amplitude. These variations are sensed by receiving antennas 12 and 13. With the antennas 12 and 13 displaced vertically, this gives a response dependent on elevation angle, hence the application to elevated target identification. By adding pulse-to-pulse comparison, moving target indication is achieved as long as clutter and clutter containing the target are viewed simultaneously and at least a small viewing angle is formed at the radar.

The reflected signals received by antennas 12 and 13 are fed to radio frequency mixers 14 and 15, respectively. Mixers 14 and 15 also receive a signal from common local oscillator 16. A common local oscillator is employed so that phase comparison might be used if desired. The present preferred embodiment utilizes amplitude comparison. The output signals from mixers 14 and 15 are fed to positive detector 19 and negative detector 20 by way of intermediate frequency amplifiers 17 and 18, respectively.

Video amplifier 21 receives simultaneously at the input thereof the positive and negative output signals from detectors 19 and 20, respectively, and produces at the output thereof a signal shown as waveform C. Video amplifier 21 is conventional and receives positive and negative signals and provides an output as shown in waveform C and may be such as shown and described at pages 145–159 and pages 731–735 (particularly FIG. E. 7 at page 734) of Vol. 22 of Radiation Laboratory Series published by McGraw-Hill Book Company, Inc., in 1948. The output signal from video amplifier 21 is fed to video amplifier 22. The output signal of video amplifier 22 is shown as positive waveform D, which is simultaneously fed to the inputs of oscilloscope 23 and modulator 24. Video amlifier 22 is conventional and provides positive output pulses as shown in wave form C and is such as shown and described at pages 145–159 and 731–753 of Vol. 22 of Radiation Laboratory Series, published by McGraw-Hill Book Company, Inc., in 1948. Oscilloscope 23 is of the conventional type utilized in radar for "A" form of presentation.

The output video signal from video amplifier 22 is utilized in modulator 24 to modulate an intermediate frequency carrier provided by way of IF carrier oscillator 25. The modulated output signal from modulator 24 is fed simultaneously to delay line 26 and IF amplifier 27. The output signal from delay line 26 is fed to IF amplifier 28. The output signals from IF amplifier 27 and 28, shown as waveforms E and F, are fed to the input of video amplifier 32 by way of positive and negative detectors 30 and 31, respectively. Video amplifier 32 is identical to video amplifier 21. The output signal from video amplifier 32 is fed simultaneously to video amplifier 33 and to "A" oscilloscope 34. Video amplifier 33 is identical to video amplifier 22. The output signal from video amplifier 33 is fed to "A" oscilloscope 35 for visual presentation upon the face thereof "A" oscilloscopes 34 and 35 are identical to "A" oscilloscope 23.

It is to be noted that elements 24–32 serve as a pulse-to-pulse comparison circuit of the conventional MTI design. The output signal from video amplifier 32, as seen visually on the face of "A" oscilloscope 34, presents pulse-to-pulse pictures of subtracted video, and it is comparatively easy to see when the moving target is in the radar beam. The presence of a moving target is indicated by the positive and negative excursions of the trace, while if the moving target is not present, the trace is relatively undisturbed.

In the operation of the above-described system, distinct indications have been given of airplanes moving on an airstrip, ships moving in a harbor, or being turned at a dock. Also, slight surf within a harbor definitely appears. Thus, the aforementioned system indicates that the moving target does not actually have to be elevated above ground. It is only necessary that the antenna beam be wide enough and the geometry such as to contain the moving target and some ground clutter at a small angle to each other.

It is to be noted that the above-described system, another embodiment of the present invention, may be utilized as an airborne moving target indication radar system known generally as AMTI. The airborne radar system detects airborne targets below the observer plane. The AMTI system distinguishes such targets from ground clutter by means of two receiving antennas spaced vertically with respect to one another. A field below the airborne radar system is illuminated by radiations, and return signals are received from the ground, as clutter, and from any elevated moving targets within the field. Those signals returned from the ground and from the elevated target which have the same range will travel along lines forming angles between them. That is, they will return to the airborne radar system at slightly different angles. Thus, the field patterns at the receiver will contain variations in phase and amplitude. These variations are sensed by the two receiving antennas vertically displaced from each other but have the same field of view. Amplitude comparison circuitry, including "A" oscilloscope, associated with the receiving antennas detects and indicates the presence of elevated targets.

Phase comparison may also be employed, although not specifically shown.

While, in accordance with the provisions of the statutes, I have illustrated and described the best forms of the invention now known to me, it will be apparent to those skilled in the art that changes may be made in the form of the method and system disclosed without departing from the spirit of the invention as set forth in the appended claims, and that in some cases certain features of the invention may sometimes be used to advantage without a corresponding use of the other features.

Having now described my invention, what I claim as new and desire to secure by Letters Patent, is as follows:

1. A system of radar moving target indication comprising means for illuminating simultaneously with radar transmitted pulses a moving target framed against ground and also the ground itself, said illumination occurring within the same radar pulse length, means for receiving the reflected signals from said moving target framed against ground and said ground itself at two positions, one of said positions being vertically displaced from the other, said reflected signals having variations in amplitude, means for detecting the positive portions of said reflected signals received at one of said positions, means for detecting the negative portions of said reflected signals received at the other of said positions, and means for comparing in amplitude said negative and positive portions of said signals to each other to obtain a resultant signal for display upon an oscilloscope, said display being representative of said moving target.

2. A system of radar moving target indication comprising means for illuminating simultaneously with transmitted radar pulse from a radar a moving target framed against ground and ground itself within the same transmitted radar pulse length, wherein the line of sight from said radar to said moving target framed against ground and said ground itself forms a slight angle, means for receiving the reflected signals from said moving target and said ground itself at two positions, one of said positions being vertically displaced from the other, said reflected signals having variations in amplitude, means for detecting the positive portions of said reflected signals received at one of said positions, means for detecting the negative portions of said reflected signals received at the other of said positions, and means for comparing said detected positive portions to said detected negative portions to obtain a resultant signal for display upon an oscilloscope, said display being representative of said moving target.

3. A system for moving target indication comprising a radar pulse transmitter, a single transmitting antenna receiving said pulses from said radar and having a beam pattern illuminating simultaneously a moving target framed against ground and ground itself within the same transmitted radar pulse length wherein the line of sight from said radar transmitting antenna to said moving target framed against ground and said ground itself form a slight angle, a pair of antennas to receive the signals reflected from said moving target framed against ground and said ground itself where one of said pair of antennas is vertically displaced from the other and said pair being positioned to have the same fields of view, said received reflected signals having variations in amplitude, means to detect positive portions of said signals received by way of one of said antennas, means to detect negative portions of said signals received by way of said other antennas, means to compare said detected positive and negative portions of said received signals to each other to obtain a resultant signals for display purposes, said resultant signals being representative of said moving target.

References Cited by the Examiner
UNITED STATES PATENTS

| | | | |
|---|---|---|---|
| 2,608,683 | 8/52 | Bleweet | 343—16 |
| 2,659,079 | 11/53 | Sherr | 343—7.7 |
| 2,669,710 | 2/54 | Sherr | 343—7.7 |

CHESTER L. JUSTUS, *Primary Examiner.*

KATHERINE H. CLAFFY, *Examiner.*